April 23, 1957  E. G. DZIALO ET AL  2,789,384
FISH LURE FOR CASTING AND TROLLING
Filed Oct. 15, 1956
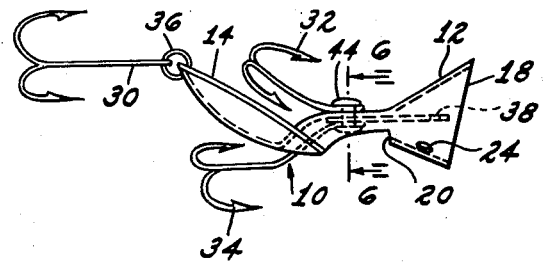
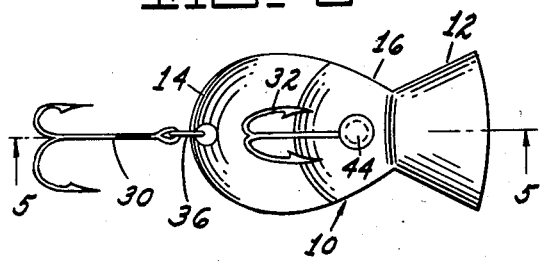
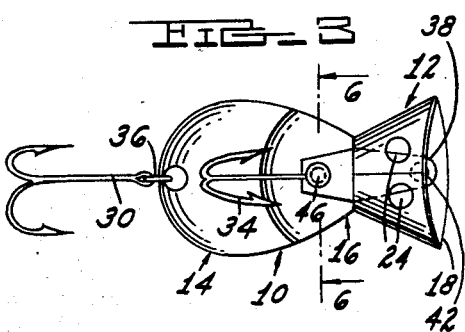
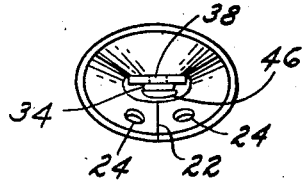
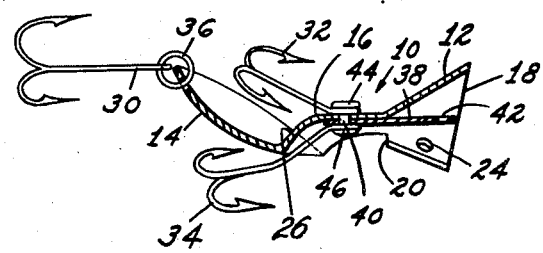
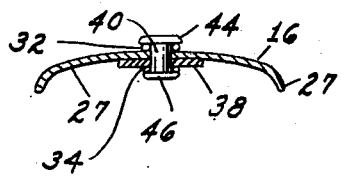
INVENTORS
EDWARD GEORGE DZIALO
ZYGMUNT EDWARD DZIALO
BY DANIEL JOSEPH DZIALO
Whittemore, Hulbert & Belknap
ATTORNEYS United States Patent Office 2,789,384
Patented Apr. 23, 1957

2,789,384

FISH LURE FOR CASTING AND TROLLING

Edward George Dzialo, Zygmunt Edward Dzialo, and Daniel Joseph Dzialo, Hamtramck, Mich.

Application October 15, 1956, Serial No. 615,896

7 Claims. (Cl. 43—42.06)

This invention relates to fishing lures and refers more particularly to fishing lures for casting and trolling.

It is the object of this invention to provide a fishing lure which will hold to a substantially steady course when drawn through the water and at the same time will have a slight up and down bobbing motion and will zig-zag slightly from side to side.

A further object is to provide a fishing lure which will not turn over or climb when drawn through the water.

Still another object of the invention is to provide a fishing lure which will have a bubbling action.

Other objects and novel features of construction will become more apparent as the following description proceeds, especially when considered with the accompanying drawing, wherein:

Fig. 1 is a side elevational view of a fishing lure embodying the invention.

Fig. 2 is a top plan view of the fishing lure illustrated in Fig. 1.

Fig. 3 is a bottom plan view.

Fig. 4 is a front end view.

Fig. 5 is a sectional view taken along the line 5—5 on Fig. 2.

Fig. 6 is a sectional view taken along the line 6—6 on Fig. 3.

Referring now more particularly to the drawing, the fishing lure 10 is formed of one piece sheet metal and includes a head portion 12, a tail portion 14 and an intermediate portion 16 integrally connecting the head and tail portions.

The head portion is substantially frusto-conical as illustrated with the large open end 18 at the front and the small end 20 to the rear. The front open end is defined by an annular margin which lies in a plane sloping downwardly and to the rear. It will be noted that the annular wall of the frusto-conical head portion is somewhat flattened or oval shaped so that the width of the head portion is greater than its height at any transverse section therethrough (see Fig. 4). The lure body 10 is originally formed from a flat metal sheet and the head portion 12 is formed by bending or shaping the metal at the front end to the frusto-conical shape illustrated, providing a seam 22 where the sides of the plate at the front end meet.

The lower or under portion of the wall defining the substantially frusto-conical head portion is formed with a pair of holes 24 for a purpose to be described hereinafter.

The intermediate portion 16 integrally connects into the rear end of the frusto-conical portion along the upper side thereof and extends rearwardly and terminates in a down-turned rear end 26 which extends across the open smaller end 20 of the head portion 12 in spaced relation thereto. The opposite sides of the intermediate portion are turned downwardly as indicated at 27 and extend from the front end thereof where they are integrally joined to the head portion to the rear end 26.

The tail portion 14 is concavo-convex and is inclined upwardly and to the rear with its concave side facing in an upward and forward direction.

Hooks 30, 32 and 34 are provided, the end hook being swivelly carried by a ring 36 through an aperture in the rear end of the tail portion.

A tongue 38 has its rear end secured to the intermediate portion 16 by a rivet 40 and extends forwardly therefrom through the open rear end 20 of the head portion and terminates adjacent to the open front end 18 thereof. The front end portion of the tongue has an aperture 42 for connection to a fishing line.

The shank of top hook 32 has a looped end which is firmly clamped between the head 44 of rivet 40 and the intermediate portion 16. The shank of bottom hook 34 has a looped end firmly clamped between the head 46 of rivet 40 and tongue 38. Hooks 32 and 34 are not free to swivel, as is hook 30, but are firmly clamped in the position shown. Also it will be understood that tongue 38 is firmly clamped to the lure.

In use, the lure is carried by a fishing line attached to the aperture 42 in the front end of the tongue. When drawn through the water, the lure will maintain the upright position shown in Figs. 1 and 5. Water entering the large end of the head portion will flow through the head portion and out the rear opening 20. The water thus flowing through the head portion will tend to stabilize the lure and cause it to travel a more or less true course. The lure will have a slight up and down bobbing motion caused at least in part by the downturned rear end 26 of the intermediate portion against which the water flowing through the head portion is directed. The downwardly and rearwardly inclined rear end 26 of the intermediate portion 16 will cause the rear end of the lure to bob up slightly while the tail portion will cause the rear end to bob down. The dished configuration of the tail portion will tend to maintain the lure on an even keel. The downward and rearward slant of the front edge 18, together with the downturned portion 26 have the effect of preventing or assisting in preventing climbing of the lure as it is pulled through the water.

The effect of the water upon the lure will also cause it to zig-zag slightly from side to side. This zig-zag motion is accentuated to some extent by the downturned sides 27 of the intermediate portion.

The openings 24 in the head portion allow a certain amount of water to escape from the head portion and to flow through these openings. The openings have also been found to be helpful in keeping the lure upright, that is, in preventing it from turning over about its longitudinal axis to an inverted position. The openings 24 also produce a bubbling action, producing a stream of bubbles trailing the lure. For small fish, only hook 30 is necessary and the other hooks 32 and 34 may be omitted.

What we claim as our invention is:

1. A fishing lure comprising a body formed of relatively thin sheet metal and having a generally frusto-conical head portion disposed longitudinally of the body with the larger end foremost, an intermediate portion integrally connecting into the top side of the rear end of said head portion and extending rearwardly therefrom and terminating in a downturned rear end extending transversely across the smaller rear end of said head portion in spaced relation thereto, and a concavo-convex tail portion integrally connecting into the lower edge of the rear end of said intermediate portion and inclined upwardly and rearwardly with the concave side facing upwardly and forwardly.

2. A fishing lure as defined in claim 1 in which the lower wall of said head portion has at least one hole therethrough.

3. A fishing lure as defined in claim 2 including a tongue secured to said intermediate portion and projecting forwardly through the smaller end of said head portion and terminating in a front end attachable to a fishing line.

4. A fishing lure as defined in claim 3 in which the opposite sides of said intermediate portion forwardly of said downturned rear end are turned downwardly.

5. A fishing lure as defined in claim 4 having hooks carried by said tail portion.

6. A fishing lure comprising a body formed of relatively thin sheet metal and having a generally frustoconical head portion disposed longitudinally of the body with the larger end foremost, an intermediate portion integrally connecting into the rear end of said head portion, a concavo-convex tail portion integrally connecting into said intermediate portion and inclined upwardly and rearwardly with the concave side facing upwardly and forwardly, and a tongue secured to said intermediate portion and projecting forwardly through the smaller end of said head portion and terminating in a front end attachable to a fishing line.

7. A fishing lure as defined in claim 6 in which the lower wall of said head portion has a pair of holes therethrough.

References Cited in the file of this patent

UNITED STATES PATENTS 1,585,943    Streich _____ May 25, 1926